United States Patent [19]

Lietard et al.

[11] 4,066,748
[45] Jan. 3, 1978

[54] CONTINUOUS PROCESS FOR PRODUCING AN AQUEOUS SOLUTION OF FERRIC CHLORIDE

[75] Inventors: Jean-Marie Lietard, Gent; Guido Matthijs, Mariakerke, both of Belgium

[73] Assignee: U C B, Societe Anonyme, Brussels, Belgium

[21] Appl. No.: 714,323

[22] Filed: Aug. 13, 1976

[30] Foreign Application Priority Data

Aug. 13, 1975 United Kingdom ............... 33701/75

[51] Int. Cl.² ........................................... C01G 49/10
[52] U.S. Cl. ................................... 424/147; 423/150; 423/DIG. 16; 423/493
[58] Field of Search .................... 423/150, 493, 658.5, 423/659 F, DIG. 1, DIG. 16, 659; 75/101 R; 424/147; 252/175

[56] References Cited

U.S. PATENT DOCUMENTS

| | | | |
|---|---|---|---|
| 2,096,855 | 10/1937 | Ladd | 423/493 |
| 3,682,592 | 8/1972 | Kovacs | 423/DIG. 1 |
| 3,873,678 | 3/1975 | McCormick et al. | 423/493 |
| 3,928,551 | 12/1975 | Booth | 423/659 |
| 3,929,963 | 12/1975 | Kurata | 75/101 R |

*Primary Examiner*—O. R. Vertiz
*Assistant Examiner*—Brian E. Hearn
*Attorney, Agent, or Firm*—Wenderoth, Lind & Ponack

[57] ABSTRACT

An aqueous solution of ferric chloride directly usable for purifying water is produced from a pickling liquor containing ferrous chloride by a process comprising the steps of 1. continuously concentrating the pickling liquor by evaporation to at least about 34.25% by weight ferrous chloride concentration;
2. continuously neutralizing the resulting concentrated liquor, which still contains free hydrochloric acid, by means of a fluidized bed of iron oxide particles (e.g. mill scales); and
3. continuously countercurrently chlorinating the resulting neutralized concentrated liquor in two successive reaction zones, to the extent of from 73 to 86% at a temperature of from 35° to 75° C in the first reaction zone and the balance at a temperature of from 40° to 100° C in the second reaction zone.

The product of said process is an aqueous solution containing per liter at least 40% by weight of ferric chloride, less than 0.1% by weight of ferrous chloride and less than 0.1% by weight of ferrous chloride. Chlorination yield is practically quantitative.

5 Claims, 1 Drawing Figure

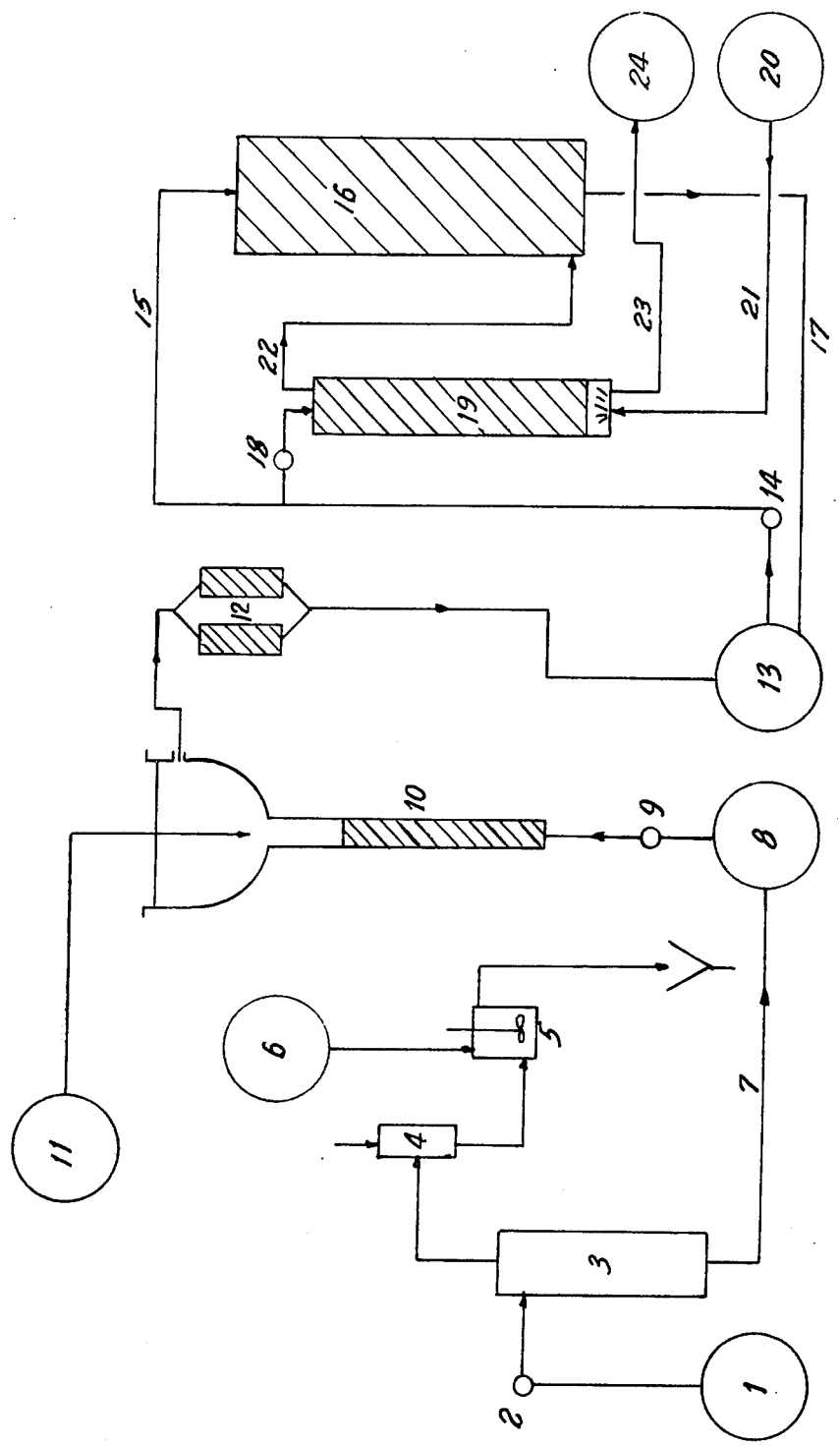

CONTINUOUS PROCESS FOR PRODUCING AN AQUEOUS SOLUTION OF FERRIC CHLORIDE

The present invention relates to a new process for the production of an aqueous solution of ferric chloride of great purity from residual pickling liquors containing ferrous chloride.

Ferric chloride is a product used in large quantities, particularly for the purification of drinking, industrial, and waste water; for this kind of application it is necessary for the ferric chloride to be of great purity, failing which it will in turn become a contamination agent for water.

It is known to produce anhydrous ferric chloride by the action of gaseous chlorine on granulated iron at bright red heat, or on iron oxide and iron phosphate at a temperature of about 1000° C, or else from iron oxides and hydrochloric acid (Ullmanns Encyklopaedie der technischen Chemie, third edition, vol. 6,1955,p.415 et seq.).

Similarly, it is known to operate in aqueous solution by dissolving granulated iron in hydrochloric acid and oxidizing the resulting ferrous chloride with gaseous chlorine or nitric acid in the presence of hydrochloric acid (Ullmanns, loc.cit., page 417).

Processes also exist in which the raw material used is ferrous chloride, which is oxidized with gaseous chlorine, either at high temperature or in aqueous solution (see for example British Pat. No. 547,005).

In industry large amounts of aqueous hydrochloric acid baths are used to eliminate the films or incrustations of iron oxides which are formed on the surface of workpieces during their metallurgical treatment. These baths, generally called pickling liquors, contain large amounts of ferrous chloride, generally between about 20 and 25% by weight, when they are exhausted. These pickling liquors are therefore an abundant and inexpensive source of ferrous chloride, which can be utilized particularly for the purpose of producing an aqueous solution of ferric chloride. However, one disadvantage of this raw material is that it is heavily contaminated, particularly by free hydrochloric acid and by the auxiliary substances used in processing iron, particularly passivating agents, lubricating oils or greases, tars, etc. Consequently, a first condition is the development of a process making it possible to obtain ferric chloride free from these contaminants, so that the resulting aqueous solution of ferric chloride can be used direct for the purpose of purifying water. Furthermore, if the process is to be economically viable it is also important to be able to carry out this process in a continuous manner so as to obtain an aqueous solution of ferric chloride of constant quality. It is to this problem that the process of the invention provides a solution.

Thus according to the invention, there is provided a process for producing an aqueous solution of ferric chloride from a pickling liquor containing ferrous chloride comprising the steps of 1. continuously concentrating the picking liquor by evaporation to at least about 34.25% by weight of ferrous chloride concentration;

2. continuously neutralizing the resulting concentrated liquor, which still contains free hydrochloric acid, by means of a fluidized bed of iron oxide particles; and 3. continuously countercurrently chlorinating the resulting liquor in two successive reaction zones, to the entent of from 73 to 86% at a temperature of from 35 to 75° C in the first reaction zone and the balance at a temperature of 40 to 100° C in the second reaction zone, whereby an aqueous solution containing per liter at least 40% by weight of ferric chloride, less than 0.1% by weight of ferrous chloride, and less than 0.1% by weight of free hydrochloric acid, is obtained, said solution being directly usable for purifying water.

BRIEF DESCRIPTION OF THE DRAWING

The drawing schematically illustrates the process of the instant invention.

The pickling liquor used as raw material in the process according to the invention generally contains from 10 to 11% of $Fe^{2+}$ which corresponds to from 22.7 to 25% of ferrous chloride. In addition, the liquor contains variable amounts of free hydrochloride acid, which may amount to 1% by weight or more, together with organic impurities. However, the contents of these substances are not critical for use in the process of the invention and they may vary between lower values and higher values than those mentioned above by way of illustration.

As it is proposed to prepare a ferric chloride solution which is directly usable for purifying water, and since a solution of this kind must contain at least about 40% by weight of ferric chloride, the crude pickling liquor must consequently be concentrated by evaporation in a first stage. By way of example without limitation, it being known that the molecular weights of the materials concerned are as follows:

$FeCl_2$: 126.75
$Cl_2$: 70.9
$FeCl_3$: 162.2, it is calculated that in order to obtain 40 g of $FeCl_3$ it is necessary to start with:

$$\frac{126.75 \times 40}{162.2} = 31.26 \text{ g of } FeCl_2 \text{ and with}$$

$$\frac{70.9 \times 40}{162.2 \times 2} = 8.74 \text{ g of } Cl_2.$$

In order to obtain 100 g of solution containing 40 g of $FeCl_3$, it is necessary to start from $100 - 8.74 = 91.26$ g of solution containing 31.26 g of $FeCl_2$, that is to say from a solution containing $$\frac{31.26 \times 100}{91.26} = 34.25\% \text{ of } FeCl_2.$$

If the pickling liquor serving as raw material contains for example from 22.7 to 25% of $FeCl_2$, it is therefore necessary to concentrate it by evaporation so that it contains at least 34.25% by weight of $FeCl_2$. It is obviously possible to concentrate the ferrous chloride solution still further, optionally effecting subsequent dilution to bring the $FeCl_3$ content in the final solution to about 40% by weight. The first stage of the process according to the invention can be carried out in any continuous evaporation apparatus, such as for example a thermosiphon evaporator, a thin layer evaporator, etc. The concentrated liquor thus obtained passes out of the first stage at a temperature of about 70° to 100° C.

In the second stage of the process of the invention the pickling liquor which has just been concentrated in the first stage is neutralized. The neutralization temperature is between 30° and 100° C, preferably between 60° and 90° C. In order to neutralize the free hydrochloric acid, according to the invention use is made of a dynamic neutralization technique in which the concentrated pickling liquor is brought into contact with a fluidized suspension of iron oxide particles. It would also be possible to consider using particules of metallic iron (and not of iron oxides) in order to neutralize the concentrated pickling liquor. However, this procedure is not advisable because the hydrogen formed might constitute an explosion risk. It is for that reason that iron oxide particles are preferred, such as for example rolling mill scales, purple ore (that is to say the residue of the roasting of pyrites), iron ores, such as hematite, magnetite, etc. In theory, neutralization may be effected with any iron oxide; however, when it is required to neutralize the free acid within a period of time compatible with the profitability of the process, it is important that this iron oxide should be as reactive as possible. In this connection mill scales give particularly good satisfaction and are advantageously used in the process of the invention. The mill scales should have a particle size of form 0.1 to 10 mm, preferably from 0.25 to 5 mm.

As indicated above, the neutralization by iron oxides of the free hydrochloric acid contained in the concentrated pickling liquor is carried out under dynamic conditions in order to accelerate considerably the speed of neutralization as compared with static conditions (see examples). According to the invention, the liquor is circulated countercurrent to the bed of iron oxide particles. The concentrated pickling liquor is introduced from the bottom into a vessel (for example a column) and the iron oxide particles are added at the top, continuously or batchwise, the speed of circulation of the liquor being so adjusted that the iron oxide particles are maintained at least partly in the form of a fluidized bed. This speed of circulation of the liquor is dependent on various parameters, such as the volume of the vessel, its geometrical shape, the height of the fluidized bed, the dimensions and reactivity of the iron oxide particles, the temperature of the liquor, and so on; it is important to select these parameters so as to ensure the completest possible neutralization of the free hydrochloric acid contained in the liquor. It will also be noted that in the course of time the dimensions of the iron oxide particles will be progressively reduced, as the result of attack by the hydrochloric acid. Consequently, it is difficult to give precise information regarding the parameters to be respected. As a concrete example, when the concentrated pickling liquor coming from the first stage contains 0.56% by weight of free hydrochloric acid and it is neutralized in the second stage of the process with a fluidized bed of mill scales at a temperature of 80° C for 6 minutes, the hydrochloric acid content of the liquor is reduced to 0.05% by weight. Generally speaking, the minimum speed of circulation of the liquor is that starting from which the particles commence to form a fluidized bed, while the maximum speed of circulation which must not be exceeded is that starting from which iron oxide particles are entrained and at which so high a hydrochloric acid content remains in the liquor (more than 0.1% by weight of HCl) that the ferric chloride solution obtained at the end of the process of the invention cannot be used as such for purifying water.

The continuous apparatus for carrying out the second stage of the process of the invention may, as an example without limitation, consist of a thermally insulated column provided at the bottom with an inlet for the concentrated pickling liquor, at the top with an inlet for the iron oxides, and provided in its upper portion with an outlet pipe for the neutralized concentrated pickling liquor. It is advantageous to widen the diameter of the column in its upper portion in order to reduce the linear speed of circulation of the liquor and thus to reduce considerably the entrainment of fines. Foreign elements (iron oxide fines, oils, tars, and other organic substances originating from the starting liquor and from the scales) which collect on the surface of the liquid are removed periodically or continously from the process by skimming. The liquor concentrated, neutralized, and freed of organic contaminants in this manner is passed on to the third stage of the process.

It would obviously be possible to conceive the reversal of the first two stages of the process, that is to say first to neutralize the pickling liquor and then to concentrate it. However, this method would have the disadvantage that in the course of the concentration of the neutralized liquor there would be partial hydrolysis of the ferrous chloride with the reappearance of hydrochloric acid in the top distillation products and in the concentrate, which would make it necessary for the liquor to be passed a second time through a bed of iron oxides. Furthermore, the quantities of liquor to be neutralized would be greater. It is for this reason that according to the invention it is preferred to concentrate the pickling liquor first and then to neutralize it (see Example 2).

In the third stage of the process of the invention, the ferrous chloride is converted into ferric chloride liquor according to the equation:

In order to ensure the complete chlorination of $FeCl_2$ to $FeCl_3$, this operation is carried out continuously in two consecutive stages. For this purpose, the operation is carried out in two separate reaction zones, namely firstly in a circuit comprising an absorption tower, and then in a reactor-finisher. The reactants are circulated in countercurrent, the gaseous chlorine being admitted at the bottom of the reactor-finisher in a very finely divided state, and the excess chlorine passing out at the top of the reactor-finisher is passed on to the absorption tower, while the neutralized concentrated liquor coming from the second stage of the process is first passed through the absorption tower, where it encounters the excess gaseous chlorine coming from the reactor-finisher, and finally passes out in the form of finished product at the bottom part of the reactor-finisher. This counter-current circulation of the liquor and gaseous chlorine ensures practically complete conversion of ferrous chloride into ferric chloride (for example less than 0.033% by weight of $Fe^{2+}$ in the final solution of $FeCl_3$), the chlorination being effected to the extent of about 73–86% in the circuit comprising the absorption tower and of about 27–14% (the balance) in the reactor-finisher. The chlorination of ferrous chloride to ferric chloride according to the invention is preferably effected at a temperature higher than normal, in view of the fact that the rate of chlorination increases with rising temperature; in the absorption column the temperature may vary between 35° and 75° C and in the reactor-finisher between 40° and 100° C. It is advantageous for the apparatus to be thermally insulated in order to reduce losses of heat to a minimum. Furthermore, in order to increase as far as possible the contact between the gaseous chlorine and the liquor, it is advantageous to supply the chlorine in very finely divided form (for example through a fritted plate) and to provide filling elements (Raschig rings, etc.) in the absorption tower and also in the reactor-finisher. The residence time of the liquor in the third stage of the process is about 0.5 to 3 hours, preferably from 1 to 2 hours.

The final product recovered at the base of the reactor-finisher is an aqueous solution containing about 40% by weight of ferric chloride, which is preferably suitable for the purification of water.

The following Examples are given for the purpose of illustrating the invention.

Example 1

Neutralization; comparison of a fixed bed with a fluidized bed

The reactor used in both cases is a jacketed glass tube (inside diameter 39 mm, length 1000 mm, capacity 1194.5 ml), provided at the top with a widened portion with a diameter of 150 mm and a height of 200 mm.

The pickling solution to be neutralized has a density of 1.34 g/cm$^3$ at 20° C and contains 29.06% of $FeCl_2$, 1.23% of $FeCl_3$, and 0.81% of HCl.

The reactor contains a bed of mill scales (of a particle size of from 1 to 6 mm in diameter) of a height of about 40 cm. The mill scales have a purity of 92.79% and contain 59.47% of FeO and 33.32% of $Fe_2O_3$.

The reactor is maintained at a constant temperature of 80° C by circulating hot water in the jacket. The solution to be neutralized, which is likewise heated to 80° C, is fed at a flow of 2500 ml per hour.

In a first test, which is not according to the invention, the pickling solution is fed at the top of the column and, after passing through the bed of mill scales, the neutralized solution is withdrawn from the bottom. A make-up of 30 g of fresh mill scales is added at the top of the column every hour. The flow of 2500 ml per hour is easily maintained in the beginning, but at the end of 12 hours the flow has already fallen to about 1000 ml per hour. The experiment is stopped at the end of 60 hours, when the flow has fallen to 100 ml per hour. Mean residence time = 38 minutes. During this period, 45,000 ml of pickling liquor have thus been neutralized.

In a second test, which is in accordance with the invention, the pickling solution is fed at the bottom of the column, likewise with a flow of 2500 ml per hour. With this flow at least the particles of small diameters are fluidized; the widening of the top of the column prevents their entrainment with the neutralized solution passing out through a side branch below the top. A make-up of 30 g of fresh mill scales is likewise added at the top of the column every hour. After 60 hours operation the flow was still 2500 ml per hour. During this period, 150,000 ml of pickling liquor were thus neutralized. Mean residence time = 11.5 minutes.

In a third test according to the invention, the same operating conditions are maintained as in the second test, except that the flow of the pickling solution and also the amount of mill scales added are progressively increased. It is thus found possible to neutralize 5000 ml per hour of pickling solution by adding 60 g of mill scales per hour, while obtaining a neutralized liquor which contains less than 0.1% by weight of free HCl. The mean residence time is then 6 minutes. If the flow of 5000 ml per hour is exceeded, an increase of free acid is found (more than 0.1% by weight of free HCl).

The fluidized bed system according to the invention is therefore considerably more effective than the fixed bed system, and it can be carried out indefinitely, without the operation ever having to be interrupted because of clogging.

EXAMPLE 2

This example shows the advantage of concentrating the pickling solution before it is neutralized.

The apparatus used is a glass boiler with forced circulation, which has useful capacity of 800 ml and is provided with a dephlegmator and a water-cooled condenser. Feeding is carried out directly in the boiler with the aid of a peristaltic pump; the condensed water is withdrawn from the top and the concentrated solution from the bottom.

In a first test, not according to the invention, a pickling solution, previously neutralized by passing over a bed of mill scales, was concentrated. 960 ml (1200 g) of this solution containing 26.4% of $FeCl_2$ + $FeCl_3$ and containing no HCl is introduced per hour. 424 ml of water containing 0.1% of HCl (0.424 g) are condensed per hour at the top. 545 ml (774 g) of solution containing 40.4% of $FeCl_2$ + $FeCl_3$ and containing 0.013% of HCl (0.1 g) are withdrawn per hour at the bottom of the boiler. 0.524 g of HCl has therefore been formed per hour by hydrolysis of iron chloride.

In a second test, which is according to the invention, 960 ml (1196 g) per hour of an unneutralized pickling solution, containing 25.5% of $FeCl_2$ + $FeCl_3$ and 0.64% of HCl (7.774 g) is concentrated, and 418 ml of water containing 0.34% of HCl (1.421 g) are condensed per hour. 552 ml (775 g) of solution containing 39.3% of $FeCl_2$ + $FeCl_3$ and 0.82% of HCl (6.355 g) are withdrawn per hour from the bottom of the apparatus. 7.776 g of HCl per hour are therefore found in the condensate and concentrate. Consequently, no hydrolysis has taken place.

EXAMPLE 3

This example shows the necessity of chlorination in two stages. In a first test, which is not according to the invention, chlorination is effected in one co-current stage.

Both the ferrous chloride solution and the gaseous chlorine are fed at the bottom of an absorption column.

The chlorination solution and the excess of chlorine pass out at the top of the column.

For an hourly flow of 1500 ml (2053 g) of a solution containing 35.0% of $FeCl_2$, 201 g per hour of chlorine are required to convert all the $FeCl_2$ into $FeCl_3$.

Using this flow of chlorine at a temperature of 70° C, 2214 g of a solution containing 33.30% of $FeCl_3$ and 6.44% of $FeCl_2$ (HCl:nil) are obtained per hour after normal operating conditions have been achieved in the column. The chlorination yield is 80.1%.

It was subsequently attempted to achieve complete chlorination, likewise at 70° C, by progressively increasing the flow of chlorine to 287 g per hour.

2253 g of a solution containing 40.72% of $FeCl_3$, 0.09% of $FeCl_2$. and 0.04% of HCl are now obtained per hour, but the yield based on the chlorine fed is only 69.05%.

In a second test, likewise not according to the invention, chlorination is effected in one countercurrent stage; chlorine is introduced at the bottom, $FeCl_2$ at the top, and the chlorinated solution is withdrawn at the bottom.

Starting with the same flow of the same ferrous chloride solution as in the first test, 2222 g per hour of a solution containing 34.80% of FeCl₃ and 5.14% of FeCl₂ (HCl:nil) are obtained at 70° C and with a flow of chlorine of 201 g per hour. The chlorination yield is 84.1%.

Subsequently, by increasing the flow of chlorine to 269 g per hour, 2253 g of solution containing 40.74% of FeCl₃, 0.05% of FeCl₂, and 0.07% of HCl are obtained per hour, but the yield based on the chlorine fed is only 74.7%.

In a third chlorination test according to the invention, the operation is carried out in two stages as described below. The operating temperature is here again 70° C. The 35.0% solution of ferrous chloride circulates continuously with a flow of 36 liters per hour through an absorption tower filled with Raschig rings. The solution absorbs the gaseous chlorine coming from a second absorption tower, which will here be called the reactor-finisher. Through the top of this finisher 1560 ml of FeCl₂ solution, already partially chlorinated and taken from the circulation circuit of the absorption tower, is continuously introduced. This solution is distributed over the filling elements of the reactor-finisher and it is chlorinated in countercurrent by the gaseous chlorine introduced in excess (63 l per hour = 201 g per hour) at the bottom of the finisher.

The excess chlorine (42 ml per hour = 134 g per hour) passing out at the top of the finisher is introduced at the bottom of the absorption tower, in which it is absorbed. 1500 ml per hour of fresh 34.25% ferrous chloride solution are introduced per hour into the absorption tower circuit. 1585 ml (2250 g) containing 40.75% of FeCl₃, 0.04% of FeCl₂, and 0.05% of HCl are withdrawn per hour at the bottom of the reactor-finisher. The yield based on the chlorine fed is quantitative.

EXAMPLE 4

Process and apparatus according to the invention.

For the description of this test, reference will be made to the accompanying drawing.

From a storage reservoir 1 holding a pickling solution containing 24.2% of FeCl₂ and 0.60% of HCl, 4000 ml (= 4960 g) of solution are fed per hour into an evaporator 3 by means of a metering pump 2. 1504 g of water and 4.5 g of HCl are evaporated per hour. The vapors evolving at the top of the evaporator are condensed in a washer 4 by a current of cold water. The water then enters a mixer 5, in which it is neutralized by a 30% NaOH solution coming from the reservoir 6; it then passes out by overflowing and is discharged to the drain.

At the bottom of the evaporator 3 there are obtained per hour 2550 ml (3450 g) of a solution containing 34.75% of FeCl₂ and 0.74% of HCl; this solution is passed through a thermally insulated pipe 7 to a thermally insulated tank 8. The still hot solution (80° C) is delivered by the pump 9 into the thermally insulated neutralization reactor 10, in which it passes from bottom to top through a bed of iron oxide mill scales (height 40 cm — 640 g of mill scales) at a space velocity of about 42.5 cm³ per minute, so that at least part of the mill scales is fluidized. The mill scales have the same composition as in Example 1. The widened top portion of the reactor reduces the ascending speed by the factor 15, thus substantially reducing the entrainment of small particles by the neutralized solution passing out through a side branch situated below the level of the liquid.

A make up of 27.5 g of mill scales coming from the reservoir 11 is added per hour. Grease and part of the foreign bodies accumulate on the surface of the liquid, from which they are skimmed from time to time. The neutralized solution still contains very fine solid particles, which are eliminated by two glass wool filters 12 used alternately; it is then passed to the thermally insulated storage reservoir 13. The temperature is about 60° C.

Mean analysis gives:
FeCl₂: 35.25%
FeCl₃: 0.47%
HCl: zero

The yield of the neutralization is 87.5% based on the weight of the mill scales, and 94.3% based on their iron oxide content. The remainder of the iron, which is found in the skimmed material and on the filters, is not re-usable.

From the reservoir 13 the neutralized ferrous chloride solution is passed at a flow of 100 liters per hour by means of the circulation pump 14 through the pipe 15 to an absorption tower 16 filled with Rascig rings, and returns to the storage reservoir 13 through the pipe 17. From this circuit 2675 ml of FeCl₂/FeCl₃ solution are taken per hour by means of a metering pump 18 and delivered to the top of the reactor-finisher 19 filled with Raschig rings, in which it is chlorinated in countercurrent.

The gaseous chlorine coming from the cylinder 20 through the pipe 21 is injected at the base of the reactor-finisher. The excess of chlorine leaves the reactor-finisher 19 through the pipe 22, and passes to the bottom of the absorption tower 16, in which it is completely absorbed.

On starting up the installation, no FeCl₂/FeCl₃ solution is fed to the reactor-finisher and all the chlorine is supplied to the absorption tower circuit. As soon as 50% of the FeCl₂ has been converted into FeCl₃, the feeding of the reactor-finisher is started. The flow of chlorine is adjusted so as to obtain a conversion of FeCl₂ to FeCl₃ of about 75–80% in the absorption tower circuit. When stationary operating conditions are reached, the flow of chlorine is 107 liters per hour (342.5 g), and that of the FeCl₂—FeCl₃ mixture to the finisher amounts to 2675 ml per hour (3746 g).

The chlorinated solution leaving at the bottom of the finisher 19 (3814.5 g or 2680 ml/h) is passed to the storage vessel 24 through the pipe 23.

Mean analysis:
FeCl₃: 41.45%
FeCl₂: 0.02%
HCl: 0.05%
Cl₂: nil

The chlorination yield is practically quantitative. The assembly comprising the absorption tower circuit and reactor-finisher and also all the pipes are thermally insulated in order to maintain the solution at a fairly high temperature and to obtain a good speed of chlorination (50° to 70° C).

We claim:
1. A process for producing an aqueous solution of ferric chloride from a pickling liquor containing ferrous chloride comprising the steps of
   1. continuously concentrating the pickling liquor by evaporation to at least about 34.25% by weight ferrous chloride concentration;
   2. continuously neutralizing the resulting concentrated liquor, which still contains free hydrochloric acid, by means of a fluidized bed of iron oxide particles; and 3. continuously countercurrently chlorinating the resulting neutralized concentrated liquor in two succesive reaction zones, to the extent of from 73 to 86% at a temperature of from 35° to 75° C in the first reaction zone and the balance at a temperature of from 40° to 100° C in the second reaction zone, whereby an aqueous solution containing per liter at least 40% by weight of ferric chloride, less than 0.1% by weight of ferrous chloride and less than 0.1% by weight of free hydrochloric acid, is obtained, said solution being directly usable for purifying water.

2. A process according to claim 1, wherein the concentrated liquor at the end of step (1) is at a temperature of about 70° to 100° C.

3. A process according to claim 1, wherein the neutralization in step (2) is carried out at a temperature between 30° and 100° C.

4. A process according to claim 1, wherein the neutralization in step (2) is carried out at a temperature between 60° and 90° C.

5. A process according to claim 1, wherein in step (2) mill scales having a particle size of from 0.1 to 10 mm are used as iron oxide particles.

* * * * *